(12) United States Patent
Heroor et al.

(10) Patent No.: US 10,066,905 B2
(45) Date of Patent: Sep. 4, 2018

(54) METHODS AND APPARATUS FOR A CONDUCTED ELECTRICAL WEAPON

(71) Applicant: TASER International, Inc., Scottsdale, AZ (US)

(72) Inventors: Siddharth Heroor, Glendale, AZ (US); Magne H. Nerheim, Paradise Valley, AZ (US)

(73) Assignee: AXON ENTERPRISE, INC., Scottsdale, AZ (US)

( * ) Notice: Subject to any disclaimer, the term of this patent is extended or adjusted under 35 U.S.C. 154(b) by 231 days.

(21) Appl. No.: 15/259,913

(22) Filed: Sep. 8, 2016

(65) Prior Publication Data

US 2018/0045491 A1    Feb. 15, 2018

Related U.S. Application Data

(60) Provisional application No. 62/373,220, filed on Aug. 10, 2016.

(51) Int. Cl.
| | |
|---|---|
| F41H 13/00 | (2006.01) |
| G06F 13/36 | (2006.01) |
| G06F 21/32 | (2013.01) |
| G06F 13/366 | (2006.01) |
| G06F 13/40 | (2006.01) |

(Continued)

(52) U.S. Cl.
CPC ......... *F41H 13/0025* (2013.01); *G06F 13/36* (2013.01); *G06F 13/366* (2013.01); *G06F 13/4068* (2013.01); *G06F 21/32* (2013.01); *G06F 21/445* (2013.01); *H04L 63/061* (2013.01); *H04L 63/0876* (2013.01);

(Continued)

(58) Field of Classification Search
CPC .......................... F41H 13/0025; G06F 13/36
See application file for complete search history.

(56) References Cited

U.S. PATENT DOCUMENTS

| 4,884,809 A | 12/1989 | Rowan |
| 6,934,836 B2 | 8/2005 | Strand et al. |

(Continued)

FOREIGN PATENT DOCUMENTS

| EP | 608418 B1 | 11/1998 | |
| WO | 2015149084 A1 | 10/2015 | |
| WO | WO 2015149084 A1 * | 10/2015 | ......... F41H 13/0018 |

OTHER PUBLICATIONS

International Searching Authority, International Search Report for International Patent Application No. PCT/US2016/054226 dated Jun. 28, 2017.

*Primary Examiner* — Scott Bauer
(74) *Attorney, Agent, or Firm* — Lawrence Letham; Mitch Chase

(57) ABSTRACT

A conducted electrical weapon ("CEW") launches wire-tethered electrodes from multiple cartridges to provide a current through a human or animal target to impede locomotion of the target. The CEW includes a handle and one or more deployment units. A handle and each deployment unit include a processing circuit and memory. A handle may provide operation and usage records to a deployment unit for storage. The information stored on a deployment unit may be unalterable once written. A handle may log a record of usage, deployment units, and other deployment information. The log file may be available to an electronic device through a secure wireless protocol.

17 Claims, 8 Drawing Sheets

(51) Int. Cl.
*H04L 29/06* (2006.01)
*H05C 1/00* (2006.01)
*G06F 21/44* (2013.01)
*H04W 12/06* (2009.01)
*H05C 1/04* (2006.01)
*H04W 76/14* (2018.01)

(52) U.S. Cl.
CPC .............. *H04W 12/06* (2013.01); *H05C 1/00* (2013.01); *H05C 1/04* (2013.01); *H04W 76/14* (2018.02)

(56) References Cited

U.S. PATENT DOCUMENTS

| | | |
|---|---|---|
| 8,594,485 B2 | 11/2013 | Brundula |
| 9,025,304 B2 | 5/2015 | Brundula |
| 2002/0112390 A1* | 8/2002 | Harling ................. F41A 17/066 42/70.11 |
| 2006/0086032 A1* | 4/2006 | Valencic ............. F41H 13/0018 42/70.01 |
| 2007/0079538 A1 | 4/2007 | Smith et al. |
| 2008/0077802 A1 | 3/2008 | Richardson et al. |
| 2009/0241394 A1 | 10/2009 | Yelle |
| 2009/0319007 A1 | 12/2009 | McNutty, Jr. |
| 2011/0169633 A1 | 7/2011 | Lauder et al. |
| 2015/0125828 A1 | 5/2015 | Otte |
| 2017/0286654 A1* | 10/2017 | Nicoll ................... F41A 17/063 |

\* cited by examiner

METHODS AND APPARATUS FOR A CONDUCTED ELECTRICAL WEAPON

FIELD OF THE INVENTION

Embodiments of the present invention relate to a conducted electrical weapon ("CEW") (e.g., electronic control device) that launches electrodes to provide a current through a human or animal target to impede locomotion of the target.

BRIEF DESCRIPTION OF THE DRAWING

Embodiments of the present invention will be described with reference to the drawing, wherein like designations denote like elements, and.

DETAILED DESCRIPTION OF THE PREFERRED EMBODIMENTS

Figure 1:
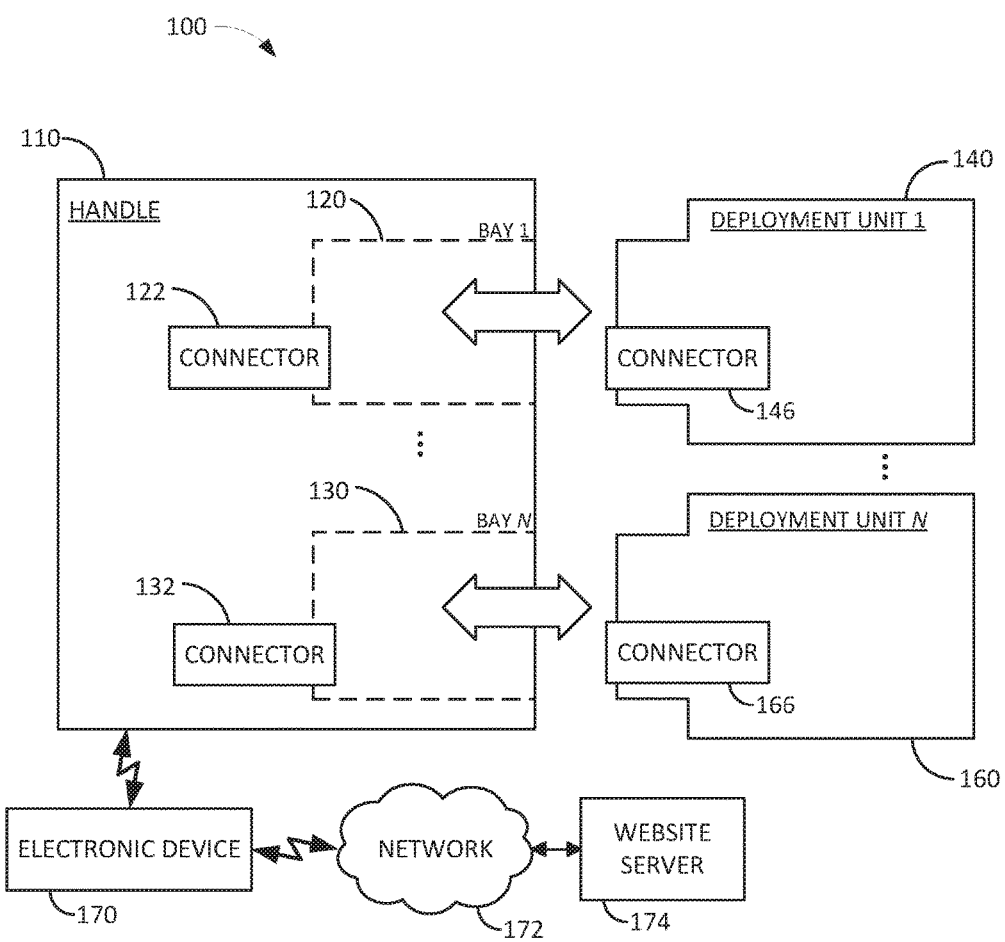
FIG. 1 is a functional block diagram of a conducted electrical weapon ("CEW") that cooperates with other devices to create an environment (e.g., ecosystem) for the operation of the CEW according to various aspects of the present invention.

A conducted electrical weapon ("CEW") provides (e.g., delivers) a current through a human or animal target. The term CEW as used herein means a handle and one or more deployment units as discussed in further detail below. Delivery of a current through a target includes delivery of the current through the tissue of the target. A CEW that includes one or more deployment units may deliver a current through one or more targets. A current may interfere with voluntary locomotion (e.g., walking, running, moving) of a target. A current may cause pain that encourages the target to stop moving. A current may cause skeletal muscles of the target to become stiff (e.g., lock up, freeze, cramp, spasm) so as to disrupt voluntary control of the muscles (e.g., neuromuscular incapacitation) by the target thereby interfering with voluntary locomotion by the target.

A current may be delivered through a target via terminals coupled to (e.g., mounted on, positioned on) the CEW. Delivery via terminals is referred to as local delivery (e.g., local stun) because the CEW is brought proximate to the target to deliver the current. To provide local delivery of a current, the user of the CEW is generally within arm's reach of the target and brings the terminals of the CEW into contact with or proximate to target tissue to deliver the current through the target.

A current may be delivered through a target via one or more electrodes that are tethered by respective wires to the CEW. Delivery via wire-tethered electrodes is referred to as remote delivery (e.g., remote stun) because the CEW, and user of the CEW, may be separated from the target up to the length of the wire tether to deliver the current through the target. To provide remote delivery of a current, the user operates the CEW to launch one or more, usually two, electrodes toward the target. The electrodes fly (e.g., travel) from the CEW toward the target while the respective wire tethers trail behind the electrodes. The wire tethers electrically couple the CEW to the electrodes. The electrodes may electrically couple to the target thereby coupling the CEW to the target. When one or more electrodes land on or are proximate to target tissue, a current may be provided through the target via the one or more electrodes and their respective wire tethers.

Conventional CEWs launch at least two electrodes to remotely deliver a current through a target. The at least two electrodes land on (e.g., impact, hit, strike) or are proximate to target tissue to form a circuit through the first tether and electrode, target tissue, and the second tether and electrode. Terminals or electrodes may contact or be positioned proximate to target tissue to deliver a current through the target. Contact (e.g., touching, abutting, embedding) of a terminal or electrode with target tissue establishes an electrical coupling with target tissue to deliver the current. A terminal or electrode that is proximate to target tissue may use ionization to establish an electrical coupling with target tissue. Ionization may also be referred to as arcing.

In use, a terminal or electrode may be separated from target tissue by the target's clothing or a gap of air. A signal generator of the CEW may provide a signal (e.g., current, pulses of current, stimulus signal) at a high voltage, in the range of 40,000 to 100,000 volts, to ionize the air in the clothing and/or the air in the gap that separates the terminal or electrode from target tissue. Ionizing the air establishes a low impedance ionization path from the terminal or electrode to target tissue. The ionization path may be used to deliver a current into target tissue. After ionization, the ionization path will persist (e.g., remain in existence) as long as a current is provided via the ionization path. When the current provided by the ionization path ceases or is reduced below a threshold (e.g., amperage, voltage), the ionization path collapses (e.g., ceases to exist) and the terminal or electrode is no longer electrically coupled to target tissue because the impedance between the terminal or electrode and target tissue is high. A high voltage in the range of about 50,000 volts can ionize air in a gap of up to about one inch.

A CEW according to various aspects of the present invention includes a handle and one or more deployment units. A CEW may have any shape or form factor. Many CEWs are shaped like a conventional firearm such as a pistol. A handle may be shaped for ergonomic use by a user. A handle includes one or more bays (e.g., compartments, receptacles) for receiving deployment units. A bay may include electrical contacts (e.g., connectors, sockets, terminals, current paths, couplers) for providing electrical power, ground, and signals to deployment units. A deployment unit may also be referred to as a cartridge or magazine. A deployment unit may be positioned in (e.g., inserted into, coupled to) a bay for deploying the electrodes from the deployment unit to perform a remote delivery. A deployment unit may releasably electrically and mechanically couple to a handle.

One or more bays of a handle may further couple to an insert from a calibration and test system or a dock so that the handle may communicate with the calibration and test system or dock. A handle coupled to a calibration and test system or a dock may further provide data to the calibration and test system or dock, which may forward the data to a server via a network.

A deployment unit includes one or more electrodes for launching toward a target to remotely deliver a current through the target. Typically, a deployment unit includes two electrodes that are launched at the same time. Launching the electrodes from a deployment unit may be referred to as activating (e.g., firing) the deployment unit. Generally, activating a deployment unit launches all of the electrodes of the deployment unit, so the deployment unit may be activated only once to launch electrodes. After use (e.g., activation, firing), a deployment unit may be removed from the bay and replaced with an unused (e.g., not fired, not activated, new) deployment unit to permit launch of additional electrodes. A user of the CEW may insert deployment units into and remove deployment units from the bays of a handle.

A CEW may cooperate with other electronic devices to establish an ecosystem. A CEW may transmit information (e.g., data) to the other devices in the ecosystem and receive data from the other devices of the ecosystem. A CEW may perform functions within its ecosystem. A CEW may cooperate with other devices of the ecosystem to perform a function. Other devices in an ecosystem of a CEW may include an electronic device, a network, and a website server.

For example, according to various aspects of the present invention, ecosystem 100, shown in FIG. 1, may include handle 110, deployment units 140 and 160, electronic device 170, network 172, and website server 174. In another implementation, an ecosystem includes handle 110, deployment units 140 and 160, and electronic device 170, but omits network 172 and website server 174.

Handle 110 may include one or more bays (e.g., bays 120 and 130), each bay may include one or more connectors. For example, bays 120 and 130 include connectors 122 and 132 respectively. A bay may electrically and physically couple to a deployment unit. A connector may electrically couple control and/or data (e.g., control/data, C/D) lines (e.g., conductors, signals) from handle 110 to a deployment unit. A connector may provide an electrical ground (e.g., current return path, signal voltage reference) for control/data and/or power lines. Power for a deployment unit, a stimulus signal, igniter control, and/or igniter ground may be provided through the one or more connectors. Deployment unit power, stimulus signal, igniter control, and/or igniter ground may be provided through electrical contacts (e.g., conductors) not associated with a connector. Deployment unit power, stimulus signal, igniter control, and/or igniter ground may be provided via a connector different than the connector used for control/data signals.

A deployment unit may electrically and physically couple to (e.g., in) a bay in a handle. A connector in a deployment unit may electrically and physically couple with a connector in a bay. Control/data signals of a deployment unit may electrically couple to the control/data signals of a handle through (e.g., via) a connector. Electrical coupling of power, ground, stimulus signal, igniter control, and/or igniter ground between a handle and one deployment unit may be accomplished by a connector. A deployment unit may have electrical contacts other than a connector for coupling to the power, ground, stimulus, igniter control and/or igniter ground of a handle. A bay may electrically couple its power and signals to the power and signals of a deployment unit without the use of a connector.

An electronic device (e.g., smartphone, tablet, laptop, personal digital assistant, camera, digital video recorder) may communicate (e.g., transmit, receive, exchange, transfer) information with a handle. An electronic device and a handle may communicate with each other using any conventional wired or wireless communication protocol. The electronic device may further communicate with other devices (e.g., website server) via a network (e.g., internet, LAN, WAN, G3, G4, WiFi).

Figure 2:
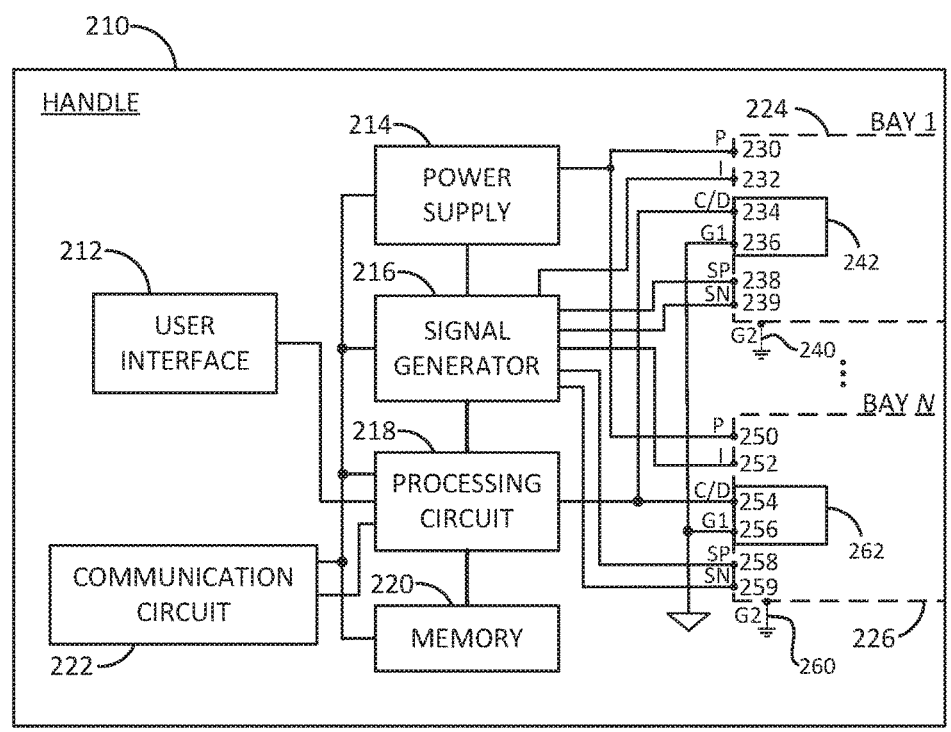
FIG. 2 is a functional block diagram of a handle of the CEW of FIG. 1.
Figure 3:
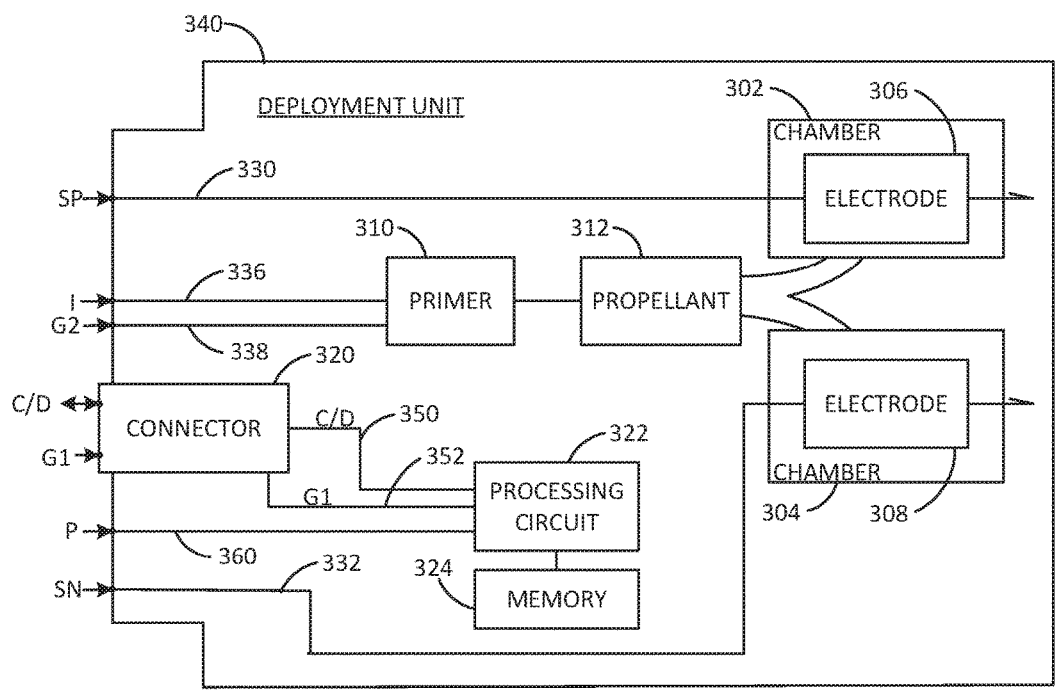
FIG. 3 is a functional block diagram of a deployment unit of the CEW of FIG. 1.

In an implementation, handle 210, shown in FIG. 2, includes user interface 212, power supply 214, signal generator 216, processing circuit 218, memory 220, communication circuit 222, bays 224 and 226, and connectors 242 and 262. Deployment unit 340, shown in FIG. 3 includes primer 310, propellant 312, connector 320, processing circuit 322, memory 324, chambers 302 and 304, and electrodes 306 and 308. Each electrode further includes a respective tether (not shown) coupled to the electrode. Handle 210 and deployment unit 340 performs the functions of a handle and a deployment unit respectively as discussed above. Together, handle 210 and one or more deployment units 340 perform the functions of a CEW.

Primer 310, propellant 312, chambers 302 and 304, electrodes 306 and 308, processing circuit 322, and memory 324 perform the functions of a primer, propellant, electrode, deployment unit interface, processing circuit, and memory, respectively, as discussed above.

User interface 212, power supply 214, signal generator 216, processing circuit 218, memory 220, communication circuit 222, bays 224 and 226, and connectors 242 and 262 perform the functions of a user interface, power supply, signal generator, processing circuit, memory, communication circuit, bays and connectors respectively as discussed above.

A power supply provides power (e.g., energy). For a conventional CEW, a power supply provides electrical power. Providing electrical power may include providing a current at a voltage. Electrical power from a power supply may be provided as a direct current ("DC") and/or an alternating current ("AC"). A power supply may include a battery. A power supply may provide energy for performing the functions of a CEW, a handle, and/or a deployment unit. A power supply may provide the energy for a current (e.g., stimulus signal) that is provided through a target to impede locomotion of the target. A power supply may provide energy for operating the electronic and/or electrical components (e.g., parts, subsystems, circuits) of a handle and/or one or more deployment units. The energy of a power supply may be renewable (e.g., one or more rechargeable batteries, solar, thermal, wind) or exhaustible. A power supply may be replaceable. The energy from a power supply may be converted from one form (e.g., voltage, current, magnetic) to another form to perform the functions of a CEW.

For example, power supply 214 provides power for the operation of user interface 212, signal generator 216, processing circuit 218, communication circuit 222, memory 220, and processing circuit 322, memory 324, primer 310, and the stimulus signal delivered via electrodes 306 and 308 to impede target locomotion. Power supply 214 provides energy for activating primer 310 of deployment unit 340. Power supply 214 provides energy to one or more deployment units (e.g., 140, 160) for performing the functions of the deployment unit.

When deployment unit 340 is inserted into bay 224, for example, connector 242 electrically couples to connector 320. The electrical coupling between connector 242 of bay 224 and connector 320 of deployment unit 340 establishes an interface between handle 210 and deployment unit 340. Handle 210 and deployment unit 340 may communicate with each other via the interface. Connector 262 establishes an interface to a deployment unit inserted into bay 226 via the connector of the deployment unit.

A user interface may include one or more controls that permit a user to interact and/or communicate with a CEW. Via a user interface, a user may control (e.g., influence, select) the operation (e.g., function) of a CEW. A user interface on a CEW may permit a user of the CEW to control some functions of an electronic device that communicates with the CEW.

A control includes any electromechanical device for operation by a user to establish or break an electrical circuit. A control may include a portion of a touch screen. A control may include any electromechanical device suitable for manual manipulation by a user. A control may include any electromechanical device for operation by a user to establish or break (e.g., open) an electrical circuit. A control may include a switch. Operation of a control may occur by the selection of a portion of a touch screen. Operation of a control provides information to a device.

A processing circuit may detect the operation of a control. A processing circuit may perform a function of the device responsive to operation of a control. A processing circuit may perform a function, halt a function, resume a function, or suspend a function of the device of which the control and the processing circuit are a part.

A user interface may provide information to a user. A user may receive visual, haptic, and/or audible information via a user interface. A user may receive visual information via devices that visually display (e.g., present, show) information (e.g., LCDs, LEDs, light sources, graphical and/or textual display, display, monitor, touchscreen). A user interface may include a communication circuit for transmitting information to an electronic device for presentation to a user. A user interface may detect the insertion or removal of a battery pack.

For example, a handle may include a control that performs the function of a safety switch. When the safety switch is enabled (e.g., on, disarmed), the CEW cannot launch electrodes or provide a current via electrodes or terminals. When the safety switch is disabled (e.g., off, armed), the CEW may perform the functions of a CEW to disable a target. When safety switch is disabled and another control (e.g., trigger) is operated (e.g., pulled), the CEW may begin the process of providing a current for disabling a target, launching electrodes to provide the current, and/or providing a warning. The controls and safety switch are a part of the user interface of the handle. A deployment unit may provide information to a handle for presentation to a user on a display of the user interface. A user interface of a handle may receive information for communication to a deployment unit. A handle may include other controls and/or a display as part of the user interface of the CEW.

A processing circuit includes any circuitry and/or electrical or electronic component for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer (e.g., server), a conventional radio, a network appliance, data buses, address buses, and/or any combination thereof in any quantity suitable for performing a function and/or executing one or more stored programs.

A processing circuit may include conventional passive electronic devices (e.g., resistors, capacitors, inductors) and/or active electronic devices (op amps, comparators, analog-to-digital converters, digital-to-analog converters, programmable logic, SRCs, diodes, transistors). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function, control a function, and/or to perform a stored program.

A processing circuit may have a low power state in which only a portion of its circuits operate or the processing circuit performs only certain functions. A processing circuit may be switched (e.g., awoken) from a low power state to a higher power state in which more or all of its circuits operate or the processing circuit performs additional functions or all of its functions.

A processing circuit may control the operation and/or function of other circuits and/or components of a system such as a handle and/or a deployment unit. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus. The handle may include a processing circuit. Each deployment unit may include a processing circuit respectively.

A memory may store information. A memory may store instructions and/or data for a processing circuit. A processing circuit may include an integrated (e.g., internal) memory. A memory may be separate from a processing circuit. A memory may include any conventional memory (e.g., nonvolatile, SRAM, flash, DRAM). A memory may include any conventional technology (e.g., solid-state, magnetoresistive, resistive, ferroelectric).

A signal generator provides a current (e.g., stimulus signal). A stimulus signal may include one or more pulses of current. A stimulus signal may include a series (e.g., succession) of current pulses. The pulses of a stimulus signal may be delivered at a rate (e.g., 22 pps) for a period of time (e.g., 5 seconds). A stimulus signal may electrically couple (e.g., via ionization) a CEW to a target. A signal generator may provide a stimulus signal at a voltage of sufficient magnitude to ionize air in one or more gaps in series with the signal generator and the target to establish one or more ionization paths to sustain delivery of a current through the target as discussed above. A pulse of a conventional stimulus signal may include a high voltage portion for ionizing gaps of air to establish electrical coupling and a lower voltage portion for providing current through target tissue to impede locomotion of the target.

A communication circuit transmits and/or receives information. A communication circuit may transmit and/or receive (e.g., communicate) information via a wireless link and/or a wired connection. A communication circuit may communicate using wireless (e.g., radio, light, sound, vibrations) and/or wired (e.g., electrical, optical) mediums. A communication circuit may communicate using any conventional wireless (e.g., Bluetooth, Zigbee, WAP, WiFi, Near Field Communication, infrared, IrDA) and/or any conventional wired (e.g., USB, RS-232, Firewire, Ethernet) communication protocol. A communication circuit may receive information from a processing circuit for transmission. A communication circuit may provide received information to a processing circuit.

A communication circuit in one device (e.g., CEW) may communicate with a communication circuit in another device (e.g., smart phone, tablet computer, laptop computer, personal digital assistant). Communications between two devices may permit the two devices to cooperate in performing a function of either device. Information transferred between a CEW and an electronic device may be encrypted (e.g., encoded, enciphered).

A communication circuit enables a CEW to communicate with an electronic device. The electronic device may exchange information with the CEW. Information provided by the CEW may include usage data (e.g., logs, history), deployment dates and/or times, device information (e.g., manufacturer, serial number, software version, power supply type), deployment unit status (e.g., operational state, safety on/off, amount of energy used or remaining in the power supply, fired or unfired), and configuration information (e.g., number of deployment units). Information provided to the CEW may include commands (e.g., instructions), configuration information, and software updates.

An electrode, as discussed above, couples to a filament and is launched toward a target to deliver a current through the target. An electrode may include aerodynamic structures to improve accuracy of flight from a CEW toward the target. An electrode may include structures (e.g., spears, barbs) for mechanically coupling to a target. Movement of an electrode out of a deployment unit toward a target deploys (e.g., pulls, tows) the filament from the deployment unit.

A propellant propels one or more electrodes from a deployment unit toward a target. A propellant applies a force (e.g., from an expanding gas) on a surface of the one or more electrodes to push (e.g., propel, launch) the one or more electrodes from the deployment unit toward the target. The force applied to the one or more electrodes is sufficient to accelerate the electrodes to a velocity suitable for traversing a distance to a target, for deploying the respective filaments coupled to the one or more electrodes, and for coupling, if possible, the electrodes to the target. A propellant may include a canister of compressed air that provides a rapidly expanding gas when opened (e.g., pierced) to propel the electrodes toward the target.

A primer, upon being activated (e.g., mechanically, electrically), may react chemically (e.g., burns, combusts) to produce an expanding gas to release the propellant (e.g., open the canister) or to launch the electrodes of a deployment unit. A primer (e.g., Berdan primer, pyrotechnic) may include a small metal cup containing an electrically sensitive explosive.

A deployment unit may include one or more connectors that electrically couple the deployment unit to a handle and to the signal generator, processing circuit, and/or power supply of the handle. One end of the electrode may be electrically coupled through a filament to a connector within the deployment unit. The current provided by the signal generator may be provided to the deployment unit via a connector. The same or different connector may be used for a processing circuit of a handle to communicate with a processing circuit of the deployment unit. Upon removing a deployment unit from the bay of the handle, the connector of the deployment unit separates from the connector of the handle to permit removal of the deployment unit from the bay of the handle and to electrically disconnect the deployment unit from the handle. Insertion of a new deployment unit into a bay electrically couples the new deployment unit to the handle.

In an implementation, handle 210 provides signals to bay 224 and bay 226. Deployment unit 340, when inserted into bay 224, electrically couples to the signals of bay 224. Another deployment unit 340, when inserted into bay 226, electrically couples to the signals of bay 226. Some or all of the signals of bay 224 may couple to some or all of the signals of deployment unit 340 inserted into bay 224 via one or more connectors, for example, connector 242. Some or all of the signals of bay 226 may couple to some or all of the signals of another deployment unit 340 inserted into bay 226 via one or more connectors, for example, connector 262. Handle 210 and deployment units 340 include the following connections.

Signal generator 216 provides two stimulus signals (e.g., different polarities, same polarities) to each deployment unit inserted into a bay. Stimulus signals SP 238 and SN 239 couple to SP 330 and SN 332 of deployment unit 340 when inserted into bay 224. Stimulus signals SP 258 and SN 259 couple to SP 330 and SN 332 of another deployment unit 340 when inserted into bay 226.

Signal generator 216 provides igniter ("I") controls 232 and 252 to bays 224 and 226 respectively, to activate (e.g., ignite, energize, launch, fire, trigger) a primer in a deployment unit. Igniter signal 232 couples to igniter signal 336 of the deployment unit inserted into bay 224 while igniter signal 252 couples to igniter signal 336 of the deployment unit inserted into bay 226. Responsive to a user control, user interface 212 may cooperate with processing circuit 218 to command signal generator 216 to provide an igniter control to a deployment unit.

A power bus may provide energy from power supply 214 of handle 210 to the components of deployment units inserted into bay 224 and/or bay 226. For example, power P 230 and ground G1 236 couple to P 360 and G1 352 respectively of deployment unit 340 inserted into bay 224 to supply power to processing circuit 322 and other components of the deployment unit inserted into bay 224. Power P 230 and ground G1 256 couple to P 360 and G1 352 respectively of deployment unit 340 inserted into bay 226 to supply power to processing circuit 322 and other components of the deployment unit inserted into bay 226.

A control/data bus may provide control and data signals from processing circuit 218 of handle 210 to the respective processing circuits of deployment units inserted into bay 224 and/or bay 226. For example, C/D 234 couples to C/D 350 of deployment unit 340 inserted into bay 224 to supply control and data signals to processing circuit 322. C/D 254 couples to C/D 350 of deployment unit 340 inserted into bay 226 to supply control and data signals to processing circuit 322.

User interface 212 may provide a notice (e.g., electric signal, data packet) to processing circuit 218 responsive to operation of a control of user interface 212 and/or upon receipt of information from the user. User interface 212 may receive information from processing circuit 218 for presentation to a user.

Processing circuit 218 controls and/or coordinates the operation of handle 210. Processing circuit 218 may control and/or coordinate the operation of some or all aspects of operation of deployment unit 340. In an implementation, processing circuit 218 includes a microprocessor that executes a stored program. Processing circuit 218 couples to memory 220, which is separately shown although it may be integrated into the microprocessor that stores the executable program. The microprocessor includes input ports and output ports and/or data buses for communication with user interface 212, signal generator 216, and deployment unit 340 to receive notices and/or information and to provide information and/or control signals.

Processing circuit 218 receives notices and information from user interface 212. Processing circuit 218 performs the functions of a CEW responsive to notices and/or information from user interface 212. Processing circuit 218 may control the operation, in whole or part, of user interface 212, signal generator 216, communication circuit 222, and/or deployment unit 340 to perform an operation of a CEW.

Processing circuit 218 may control signal generator 216 so that the stimulus pulse is provided by some electrodes of deployment unit 340, but not by other electrodes. Processing circuit 218 may control signal generator 216 so that some electrodes of deployment unit 340 electrically couple with a target while other electrodes of deployment unit 340 do not electrically couple with the target. Processing circuit 218 may control signal generator 216 so that some or all of the electrodes of deployment unit 340 inserted into bay 224 and/or some or all of the electrodes of deployment unit 340 inserted into bay 226 provide a stimulus signal through the target. Processing circuit 218 may instruct signal generator 216 to alternate providing the stimulus signal between deployed pairs of electrodes of deployment unit 340 inserted into bay 224 and/or deployment unit 340 inserted into bay 226.

Communication circuit 222 may perform the functions of wired and/or wireless communication discussed above. Communication circuit 222 may include one or more transceivers for wireless and/or wireless communication. Communication circuit 222 may communicate with an electronic device.

In an implementation, communication circuit 222 may couple with a website (e.g., server, computer, network, internet, evidence management system, evidence.com, records management system, dispatch system) through an electronic device. Using, for example, Bluetooth Low Energy ("BLE"), communication circuit 222 may advertise (e.g., transmit a beacon, broadcast) its unique identifier to a BLE enabled electronic device. An application on the electronic device may scan for identifiers. If an identifier is found, the communication circuit 222 and the electronic device may authenticate one another and establish a secure communication channel. The communication channel may encrypt (e.g., protect against unauthorized access) all or some of the data (e.g., messages, information) transferred between the communication circuit and the electronic device. The electronic device may, in turn, establish a secure and/or encrypted communication channel with a website and forward information from the CEW to the website. The information provided by the CEW may include usage data indicating when a deployment unit was activated, which deployment unit and/or handle, date and/or time of activation, and energy levels. The transfer of information may conform to evidentiary rules.

Electrodes 306 and 308 are deployed from chambers 302 and 304, respectively, in deployment unit 340. Depending on the polarity of the voltage that may be applied by a signal generator on each launched electrode, the processing circuit of handle 210 may instruct signal generator 216 to provide a stimulus signal through electrodes 306 and 308 to deliver a current through target tissue. Stimulus signal SP 330 provides the stimulus signal to electrode 306 and stimulus signal SN 332 provides the stimulus signal to electrode 308. For clarity, only two electrodes are shown for deployment unit 340 in FIG. 3. Electrodes may provide a stimulus signals that has any combination of polarities with respect to ground.

Primer 310 of deployment unit inserted into bay 224 may be activated by igniter control 336. Responsive to user interface 212, processing circuit 218 may command signal generator 216 to provide igniter control 232 to bay 224 or igniter control 252 to bay 226 which couples to igniter control 336 of deployment unit 340 of the respective bay. Igniter signal 336 activates primer 310 which provides a force that releases a force from propellant 312 that launches (e.g., propels, thrusts, fires) electrodes 306 and 308 toward a target. Propellant 310 provides a force to launch electrodes as discussed above.

Igniter control 336 may apply a voltage (e.g., potential difference) in relation to igniter ground ("G2") 338. Ground G2 338 may electrically couple to an igniter ground in a handle (e.g., ground 240 or 260 in handle 210).

Processing circuit 322 of deployment unit 340 in bay 224 and deployment unit 340 in bay 226 electrically couples to processing circuit 218 via C/D signal 350 and C/D 234 and C/D 254 respectively. C/D signal 350 may couple with a handle processing circuit through connector 320. Connector 320 may include circuitry. The circuitry in connector 320 may provide AC and/or DC coupling with the use of passive or active circuit components.

C/D signal 350 may be sent or received as a voltage with respect to ground G1 352. G1 352 may be distinct (e.g., electrically isolated, decoupled) from ground G2 338.

C/D signal 350 may use bidirectional or half-duplex communication (e.g., transmission of signals in both directions, but not simultaneously). Half-duplex communication may be achieved by the use of tri-state (e.g., three-state, 3-state) logic. Tri-state logic allows a data port to assume a high-impedance state in addition to a binary zero or one level. For example, processing circuit 322 may output a signal (e.g., binary zero or one) to handle 210 when the processing circuit 218 input/output ("I/O") port is in a high-impedance state. The high impedance state may be accomplished by a pull-up resistor (e.g., a resistor between the signal line and the power supply voltage). To signal a binary zero, the processing circuit would bring the signal line to a low voltage (e.g., at or near the ground voltage, current sink).

A handle and deployment unit may use a sequence of messages (e.g., instruction, command, data, and/or response having a specific number of bits, bytes, or packets) to accomplish reliable communication between each other. Communication may include messages and/or signals in any conventional technology, format, and modulation. A message may include in sequence: a header, a payload, and a postscript. The header and postscript may be defined by any communication protocol and/or standard. The header may include indicia identifying the source and may further include indicia identifying one or a group of intended receivers. A payload is a portion of a message that conveys information for performing a function of the system.

Communication between a handle and a deployment unit may include confirmation of message delivery. For example, receipt of message (e.g., commands, instructions) sent by a handle to a deployment unit may be confirmed by the deployment unit by echoing (e.g., returning, writing-back) the entire or a portion (e.g., transmission unit) of the received message. If an echoed message is incorrect, the message transmission may be aborted or restarted. For example, a deployment unit may echo back each byte of a message from a handle was it is received. If the echo byte is incorrect, transmission of the message may be aborted or restarted.

If the entire message received by the handle from the deployment unit is identical to the message sent by the handle to the deployment unit then message delivery is confirmed. If a message is not returned (e.g., timed out), or the returned message differs from the sent message, a transmission error may have occurred. Messages may also include error detection and/or correction (e.g., checksum, parity) bits. Error detection may detect one or more bits in a message received incorrectly. Error correction provides for correction of one or more bits in a message received in error.

Figure 4:
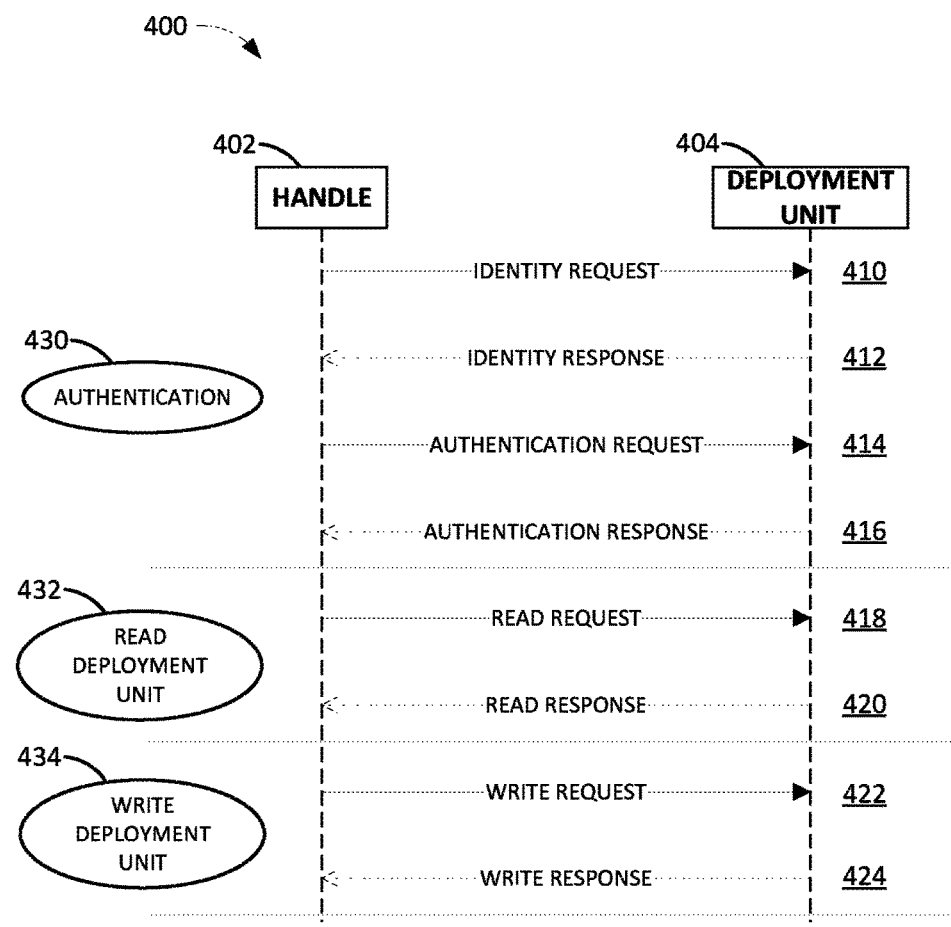
FIG. 4 is a sequence diagram showing messages communicated between the handle and a deployment unit of FIG. 1.

For example, message sequence 400 of FIG. 4 includes messages 410, 412, 414, 416, 418, 420, 422, and 424 between handle 402 and deployment unit 404. Handle 110 and 210 may perform the functions of handle 402 as discussed below. Deployment unit 140/160 and 340 may perform the functions of deployment unit 404 discussed below.

Handle 402 and deployment unit 404 may exchange messages 410-416 to perform authentication process 430. Authentication may provide handle 402 with proof or evidence of a valid deployment unit. Authentication may be provided by a challenge-response protocol. In response to an authentication request, a processing circuit in deployment unit 404 may compute a response using a predetermined algorithm (e.g., set of rules, calculations, instructions). Handle 402 then compares the response with an expected response based on the predetermined algorithm executed by a processing circuit in the handle. If the response provided agrees with the expected response, the deployment unit may be considered authenticated. In another implementation, deployment unit 404 may be authenticated by providing a password (e.g., predetermined message or word) to handle 402. Authentication may be accomplished by any conventional method.

In an implementation, during authentication process 430, handle 402 sends an identity request message to deployment unit 404 in message 410. Deployment unit 404 responds with identity response message 412. The identity response may contain a unique identifier (e.g., serial number), manufacturer name or number, device type, and/or other information about deployment unit 404. Device type may include a deployment unit, simulator cartridge, a calibration and test system, or a dock. Handle 402 may then send an authentication request message 414 requesting that deployment unit 404 respond with a predetermined response. Deployment unit 404 responds with authentication response message 416. After authentication process 430 is successfully performed, handle 402 may send read and/or write requests to deployment unit 404.

Handle 402 may read data from deployment unit 404 by executing read deployment unit process 432. Data read from deployment unit 404 may be stored in a memory of deployment unit 404. For example, for handle 402 to read data, handle 402 sends read request message 418 to deployment unit 404 to request specified information from deployment unit 404. The requested information is provided to handle 402 by deployment unit 404 in read response message 420. Prior read response message 420, deployment unit 404 may echo back (not shown) read request 418 to handle 402. The echo back serves as confirmation that read request 418 was correctly received by deployment unit 404. Echo back may retransmit the message as received back to the sender.

Handle 402 may write data to deployment unit 404 by executing write deployment unit process 434. Data written to deployment unit 404 may be stored in a memory of deployment unit 404. For example, for handle 402 to write data, handle 402 sends write request message 422 to deployment unit 404. The write request message includes the data that is to be written into deployment unit 404. Prior to responding with write response message 424, deployment unit 404 may echo back (not shown in FIG. 4) write request message 422 to handle 402. The echo back serves as confirmation that write request message 422 was correctly received by deployment unit 404. After deployment unit 404 has received write request 422 and written the data, it sends write response message 424 to handle 402. Write response message 424 confirms that any instruction written by the handle to a deployment unit has been executed.

In an implementation, read request message 418 and write request message 422 are instructions from processing circuit 218 of handle 210 to processing circuit 322 of deployment unit 340. Processing circuit 322 may respond to a read instruction (e.g., read request message 418) by providing data from memory 324 to processing circuit 218. Processing circuit 322 may respond to a write instruction (e.g., write request message 422) by writing data to memory 324. Processing circuit 322 may prevent the contents of memory 324 from being altered once it has been written to implement a write-once operation.

For example, responsive to an instruction from processing circuit 218, processing circuit 322 may write (e.g., set, record) a fired flag (e.g., fired status) in memory 324. The fired flag may be represented by one or more bits at a location in memory 324. Processing circuit 322 may prevent alteration (e.g., modifying, erasing, over writing, changing) of the fired flag in memory 324 so that once the bit is set to the fired value, it cannot be change. Hardware (e.g., electronic or electrical circuitry), or processing circuit software or firmware may block (e.g., prevent, lock) alteration of the fired flag after it has been set. The fired flag is set to the fired value when the electrodes are launched from the deployment unit. Because it cannot be change after being set, the fired bit may be depended on to indicate that a deployment unit has been used. The fired bit value may be requested by handle 402 when a deployment unit is interrogated via read 432, thereby permitting the handle 402 to detect when a fired deployment unit is inserted into a bay.

In the event that the device type is not a deployment unit (e.g., simulator cartridge, calibration and test system, dock), the fired flag is not set.

Figure 5:
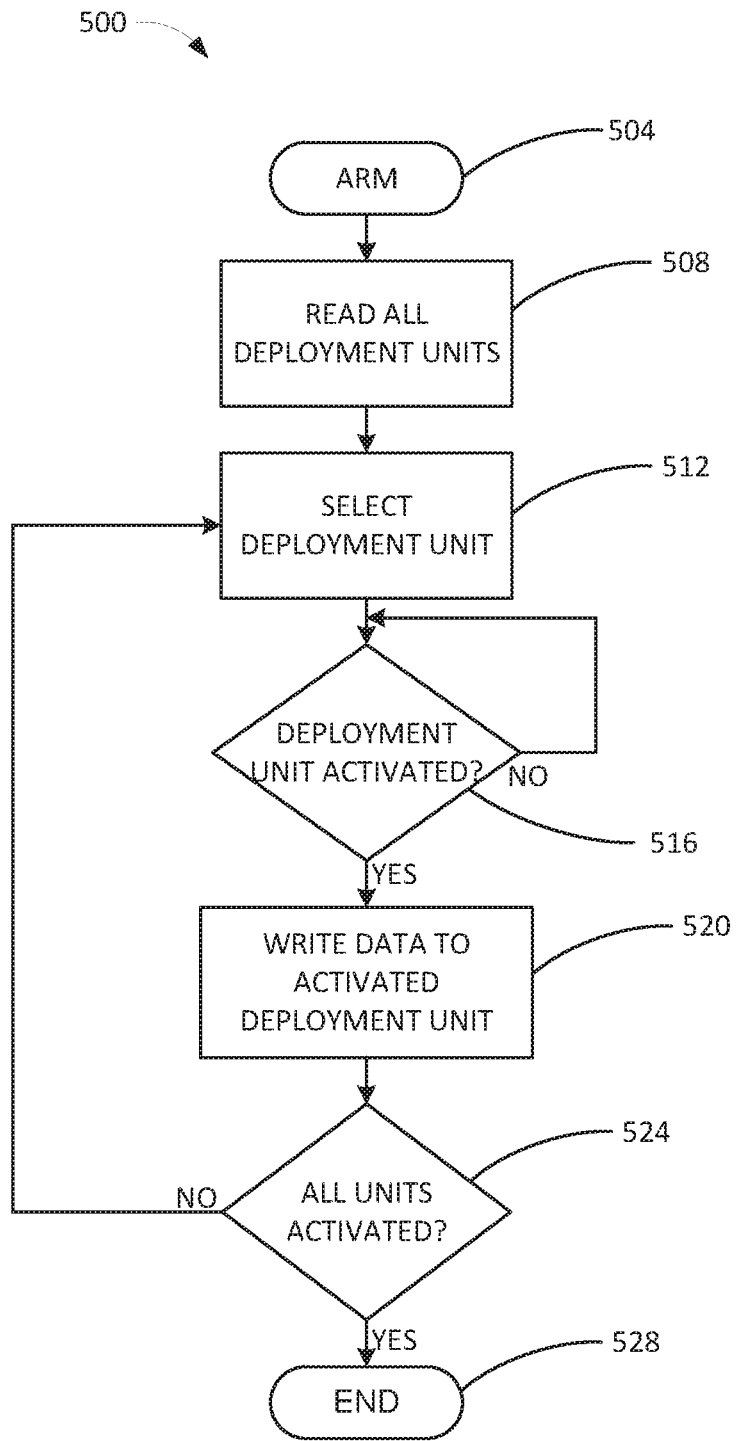
FIG. 5 is a flow diagram of a method of operation of the CEW of FIG. 1.

A CEW may perform method 500 of FIG. 5 to read, select, and activate deployment units. Method 500 includes the following processes: arm 504, read 508, select 512, activated 516, write data 520, all units activated 524, and end 528.

A processing circuit, in either a handle or a deployment unit, may perform may perform processes to accomplish a function. For example, authentication process 430, read deployment unit process 432, and write deployment unit process 434 are processes performed by processing circuit 218 and processing circuit 322 to accomplish authentication of a deployment unit, to read data from a deployment unit, and to write data to a deployment unit. The processing circuits of a handle and deployment units may perform other processes to perform the functions of a handle, a deployment unit, and a CEW.

A processing circuit may perform any, all, or parts of a process in any conventional manner. A processing circuit may perform processes in series, in parallel, some in series and others in parallel. A processing circuit may perform a process upon receiving information needed for the process or upon receipt of a control signal. A processing circuit may determine the present processing being executed and determine a next process for execution. A next process for execution may depend on a result of executing a present process.

In process arm 504, a CEW, and in particular the handle of the CEW, detects that it has been armed. As discussed above, a CEW is armed by a user switching a safety switch off. When the safety is switched off, the CEW prepares itself to launch electrodes and/or to provide a stimulus signal.

For example, in arm 504, processing circuit 218 detects that the safety switch (not shown), which is part of user interface 212, has been moved from the on to the off position. Once processing circuit 218 detects that handle 210 has been armed, control (e.g., execution, program flow) passes to process read 508.

In process read 508, the handle reads data from (e.g., interrogates) each deployment unit installed in the one or more bays of the handle. For example, processing circuit 218 may sequentially read (e.g., polled, read in a particular order) the deployment units inserted the bays using read process 432 discussed above. Data read from a deployment unit may include a name of the manufacturer of the deployment unit, deployment unit identifier (e.g., serial number), deployment unit type (e.g., model number), date of manufacture, deployment unit firmware version, and expiration date of the deployment unit. Data read from a deployment unit may further include data stored in the deployment unit during manufacture and/or test. Further, a user or agency may specify an arbitrary string that is stored in the deployment unit for later transfer to a server. The arbitrary string may be used to classify the data provided by a deployment unit. Processing circuit 218 may store some or all of the data received from a deployment unit in memory 324. Such information may be stored in a log. Processing circuit 218 may provide the data read from the one or more deployment units to another device via communications circuit 222 or to a user via a display on user interface 212. Control moves from read 508 to select 512 once the read operation is complete.

In process select 512, the handle selects one deployment unit and cooperates with the selected deployment unit in the performance of process activated 516 and process write data 520. For example, select 512 may select one of deployment unit 340 inserted into bay 224 or bay 226. Activated 516 uses read 432 to determine whether the fired flag of the selected deployment unit has been set. If the deployment unit returns a fired flag that is set (e.g., fired, activated), select 512 may then select another deployment unit until all deployment units have been selected.

If the deployment unit returns a fired flag not is not set (e.g., not fired), then the selected deployment unit may be used to launch electrodes toward a target to provide a stimulus signal through the target. If the selected deployment unit has not been fired, that deployment unit remains selected for use to deliver a stimulus signal until that deployment unit has been activated.

Once the deployment unit has been activated, write data 520 sets the fired flag in the selected deployment unit using write 434 as discussed above. Write 520 may write additional data (e.g., date and/or time of activation, handle identifier, energy level of stimulus signal) to the deployment unit.

A handle repeats steps 512 and 524, as discussed above, until all deployments units have been activated or the CEW exits the armed state in end 528. When a handle exits the armed state, the handle stops executing all processes performed while armed.

Figure 6:
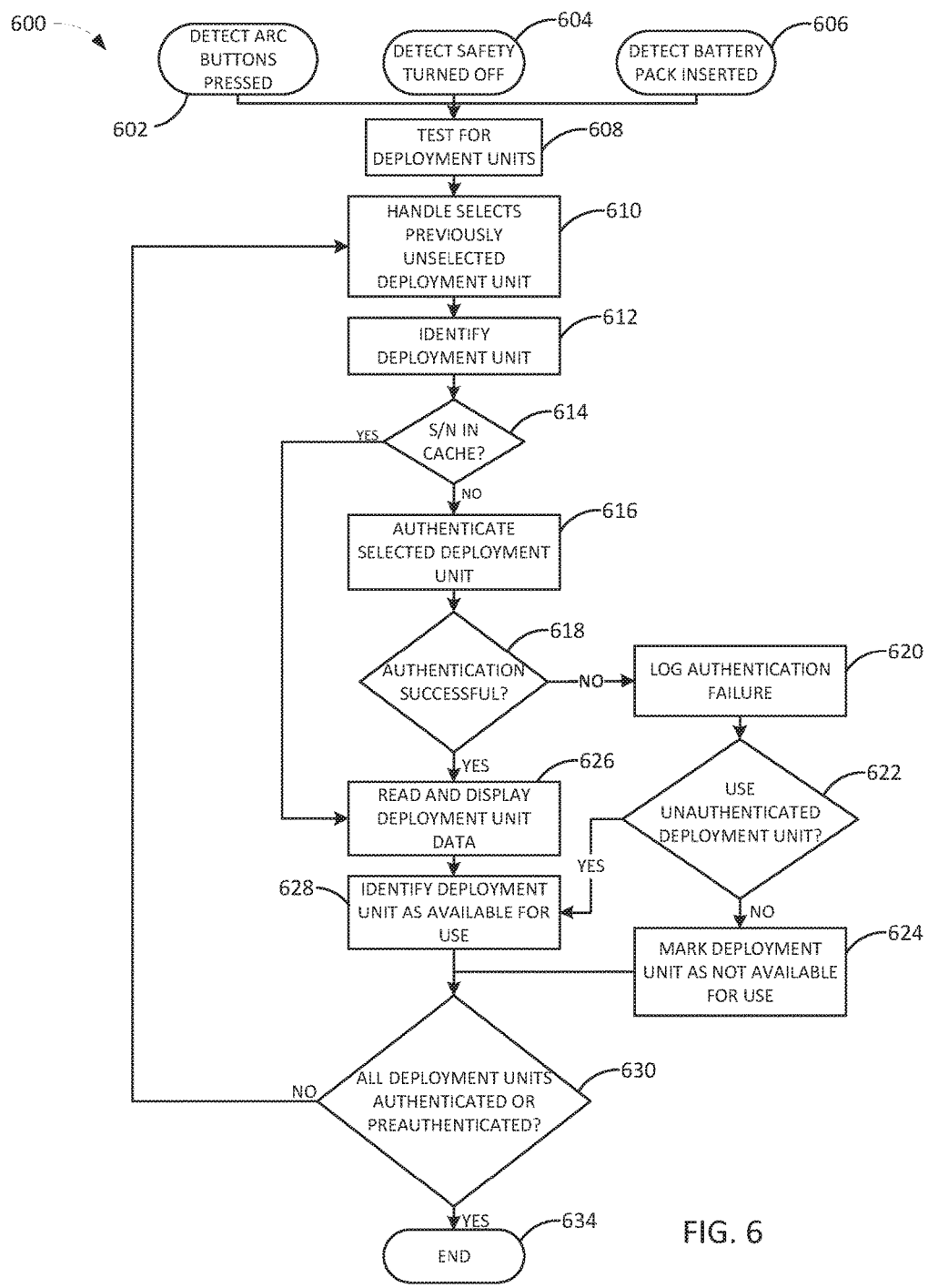
FIG. 6 is a flow diagram of another method performed by the handle of the CEW of FIG. 1.

A CEW may perform method 600 of FIG. 6 to communicate with one or more deployment units coupled to a handle. Reading data from a deployment unit is accomplished using process read 432 while writing data to a deployment unit is accomplished using write process 434. Authentication of a deployment unit is accomplished using process authentication 430. Method 600 includes the following processes: arc buttons 602, safety 604, battery pack 606, test for units 608, handle selects 610, identify 612, S/N 614, authenticate 616, successful 618, failure 620, unauthenticated 622, mark 624, display 626, available 628, all authenticated 630, and end 634. A processing circuit in a handle may perform all or part of method 600. A processing circuit may cooperate with a communications circuit to perform (e.g., execute) method 600.

Method 600 may be initiated by an action taken by a user. In arc button 602, the CEW may detect the arc buttons pressed (e.g., pushed, activated, turned on). An arc button is a user interface control as discussed above. In an implementation, a CEW has two arc buttons. When both arc buttons are pressed and held, the CEW is armed and ready for use. For example, in process arc button 602, processing circuit 218 may detect that both arc buttons are concurrently pressed. Upon detecting that both arc buttons are pressed, control moves to process test for units 608.

In process safety 604, the CEW may detect that the safety control is turned off. The safety control is a control of the user interface control as discussed above. Turning the safety off arms the CEW and prepares the CEW for firing. For example, in process safety 604, processing circuit 218 detects that the safety switch is turned off. Control then proceed to test for units 608. If method 600 begins by processing circuit 218 detecting that the safety is switched off, method 600 finishes prior to the start of method 500.

In process battery pack 606, a handle may detect the insertion of a battery pack into the handle. In an implementation, a handle may respond to insertion of a battery pack in the same way as it responds to a user input on a user interface. In another implementation, insertion of battery pack may cause the processing circuit to execute a startup routine. For example, in process battery pack 606, processing circuit 218 detects insertion of a battery pack into handle 210. Control then proceeds to process test for units 608.

In process test for units 608, the handle may poll (e.g., test in a particular or serial sequence, select in sequence) bays for the presence of deployment units. Test for units 608 may send a message or data serially to each bay to determine whether a deployment unit is inserted into the bay. Upon detecting a deployment unit inserted into the bay, the handle records (e.g., marks) that bay as holding a deployment unit.

For example, processing circuit 218 may send a message or data using C/D 234 to test for a deployment unit in bay 224. If deployment unit 340 is inserted into bay 224, processing circuit 322 echoes the data or message over C/D 350 and C/D 234 to processing circuit 218. If a response is not received by processing circuit 218 after a predetermined period of time, processing circuit may mark bay 224 as empty (e.g., no deployment unit inserted). Processing circuit 218 may send a message or data using C/D 254 to test for a deployment unit in bay 226. If deployment unit 340 is inserted into bay 226, processing circuit 322 echoes the data or message over C/D 350 and C/D 234 to processing circuit 218. If no echoed data is not received within a predetermined time interval, the bay is marked as empty by handle 210. Processing circuit 218 repeats the test for each bay in the handle, then control proceeds to process handle select 610.

In process handle selects 610, the handle selects a previously unselected deployment unit inserted into one of the bays. Selection of a deployment unit may be accomplished by selecting a bay in sequence. When a deployment unit has been selected, the handle records that deployment unit and/or bay as having been selected. In an implementation, deployment units may not be inserted into a bay while the safety is turned off or while the arc buttons are pressed.

For example, after determining which bays hold deployment units, processing circuit 218 selects one of the deployment units. Processing circuit 218 may select deployment unit 340 in bay 224 and record the selection in memory 220. A record is kept by processing circuit 218 of which bays have deployment units and which bays and/or deployment units have been selected by handle selects 610. Upon selection of a deployment unit, processing circuit 218 may then proceed to identify 612.

In process identify 612, the handle requests (e.g., interrogates, queries) information (e.g., manufacturer, type) from the selected deployment unit using read 432. The information may include a unique identifier (e.g., serial number). The deployment unit that identifies itself is the deployment unit selected in handle selects 610.

For example, processing circuit 218 sends an identity request message 410 to the selected deployment unit over C/D 234 or 254 using process read 432. After confirming receipt of the message, the deployment unit uses process identity response 412 to provide its serial number. Control proceeds to process S/N 614.

In process S/N 614, the unique identifier of the selected deployment unit may be compared with the deployment unit identifiers stored in memory of the handle. If a match is found, the selected deployment unit was previously authenticated by the handle, so the execution of method 600 may skip the authentication process (e.g., processes 616 and 630). If a match is not found in the memory of the handle, the deployment unit was not previously authenticated by the handle, so the handle must now authenticate the selected deployment unit.

For example, processing circuit 218 searches memory 220 for the unique identifier provided by the selected deployment unit in process identify 612. If the unique identifier is stored in memory 220, control proceeds to process all authenticated 630, thereby by passing the authentication process. If the unique identifier is not stored in memory 220, control proceeds to process authenticate 616.

If a CEW is armed by switching the safety off, method 600 is executed to determine which bays hold cartridges that may be fired. While executing method 600, assume that the cartridge in each bay is authenticated and the serial number of the cartridge is recorded in the handle as having been authenticated. Assume that the CEW is disarmed (e.g., safety off) without firing any of the cartridges in the bays. When the CEW is armed again, none of the cartridges will need to be authenticated again because they were previously authenticated. If one of the cartridges is fire and replaced after the CEW is disarmed, then the new cartridge will need to be authenticated, but not of the other cartridges will need to be authenticated because they were previously authenticated.

In process authenticate 616, the handle attempts to authenticate the deployment unit. Authentication may be accomplished by authentication 430 as discussed above. The handle may send an authentication request message to the deployment unit. The deployment unit may respond with an authentication response message. The handle compares the response with the expected response in process successful 618.

For example, processing circuit 218 creates authentication request message 414 with a random or pseudorandom payload. The message is sent to the selected deployment unit via C/D 234 if the selected deployment unit is in bay 224 or C/D 254 if the selected deployment unit is in bay 226. Processing circuit 322 of the selected deployment unit confirms receipt of the authentication request message by echoing the message over the same data bus. Processing circuit 322 encodes the payload from authentication request message 414 and send authenticate response message 416 to processing circuit 218 over via C/D 350 and C/D 234 or C/D 254 depending on the bay into which the selected deployment unit is inserted. Authenticated response message 416 includes the encoded payload. Control proceeds to process successful 618.

In process successful 618, the handle compares the expected authentication response with the received response. If the expected and received responses match, authentication is considered successful. The handle may then request additional information from the selected deployment unit. If the expected and received responses do not match, the authentication may be considered to have failed.

For example, processing circuit 218 receives an authentication response from deployment unit 340 over C/D 234 or 254. Processing circuit 218 compares the response with an expected response. The expected response may be computed (e.g., generated, calculated) from the same data used to make the payload of authentication request message 414 or may be a response resident in memory 220. If the expected and received responses do not match, control proceeds to process failure 620. If the expected and received response matches, control proceeds to display 626.

In process failure 620, the handle may record an authentication failure and associate it with the unique identifier of the selected deployment unit. The failure may be recorded in a log stored in handle memory.

For example, processing circuit 218 writes an authentication failure message in memory 220. The failure message is associated with the unique identifier of the deployment unit and stored in memory 220. Upon recording the failure in memory, control proceeds to process unauthenticated 622.

In process unauthenticated 622, the authentication failure of a deployment unit may be presented to a user via the CEW user interface. The user interface may permit the user to authorize using the unauthenticated deployment unit. In another implementation, the CEW may determine that an unauthenticated deployment unit is suitable for use. The processing circuit may execute a stored program to make the determination.

In an example, processing circuit 218 displays the authentication failure to a user via user interface 212. User interface 212 includes a display on which the message regarding the authentication failure is displayed. A user may operate a control of user interface 212 to instruct processing circuit 218 to use the deployment unit even though it was not authenticated. If the user inputs a decision to use an unauthenticated deployment unit, control proceeds to available 628. If the user input is to not use the deployment unit, processing circuit 218 proceeds to process mark 624. In another example, processing circuit 218 may decide to use the unauthenticated deployment unit without user input and control proceeds to process available 628. Processing circuit 218 may decide to not use the deployment unit, in which case, control proceeds to process mark 624.

In process mark 624, an unauthenticated deployment unit may be marked as not available for use. Marking may be accomplished by storing the availability status in the memory of the deployment unit using write 434. The availability of a deployment unit and/or a bay may be recorded by the handle.

For example, processing circuit 218 may send a write request to a deployment unit 340 in bay 224 over C/D 234 and C/D 350. The write request may contain a request to record that the deployment unit as not available for use. Processing circuit 322 may confirm the request and reply with a write response after the not available status has been written to memory 324. Processing circuit 218 may further make a record of which bay holds a deployment unit that is not available for use. Control proceeds to process all authenticated 632.

If the authentication of a deployment unit was successful, process display 626 requests additional information from the authenticated deployment unit using read 432. Additional information may include expiration date, manufacture date, length of tethers (e.g., range), and the identity of the manufacture. The handle may present the additional information on the display of the user interface so that the user may see and be informed of the information.

For example, processing circuit 218 may execute read 432 to get additional information from the authenticated deployment unit. Processing circuit 218 may send the information to user interface 212 for presentation to a user via a display of user interface 212. In an implementation, processing circuit 218 requests and receives the identity of the manufacturer of the deployment unit from the deployment unit. Processing circuit 218 sends the identity of the manufacturer to user interface 212. User interface 212 provides the identity of the manufacture to a display. The display presents the identity (e.g., name) of the manufacture on the display in a manner that is readable and comprehensible to a user.

For example, processing circuit 218 requests the identity of the manufacture from the deployment unit and receives the information that the identity of the manufacture is TASER. Processing circuit 218 sends the identity of the manufacture to user interface 212. User interface 212 presents the name TASER on the display of user interface 212, so that it may be read by a user. Presenting the name of the manufacturer on the display of user interface 212 so that it may be read by a user may provide confidence to the user that the deployment unit in a time of stress or exigency will operate to perform its intended function.

In process available 628, the CEW records that the selected deployment unit in a particular bay is available for use. Recording that a deployment unit in a particular bay is available for use indicates that the deployment unit and bay may be used to launch electrodes and to provide a stimulus signal through a target.

For example, processing circuit 218 may record in memory 220 that deployment unit 340 in bay 224 is available to be fired. Once the information is written in memory 220, control proceeds to process all authenticated 630.

In all authenticated 630, the handle may check to see if all deployment units inserted in bays of the handle have been authenticated or previously authenticated. If any bay has a deployment unit that has not been authenticated, previously authenticated, or authentication failed, control returns to process selects 610. If the deployment units in the bays have all been authenticated, previously authenticated, or failed authentication, execution of method 600 is complete.

For example, processing circuit 218 may store information as to which bays have been polled and which bays hold authenticated deployment units, deployment units that failed authentication, or are empty. Once all bays have been checked and the deployment units in the bays authenticated or failed to authenticate, method 600 is complete and the method exits at end 634. If a bay remains unchecked the execution control by processing circuit 218 returns to process selects 610.

After method 600 has been performed, the CEW may perform method 500 to fire the deployment units to provide a stimulus signal through a target.

Figure 7:
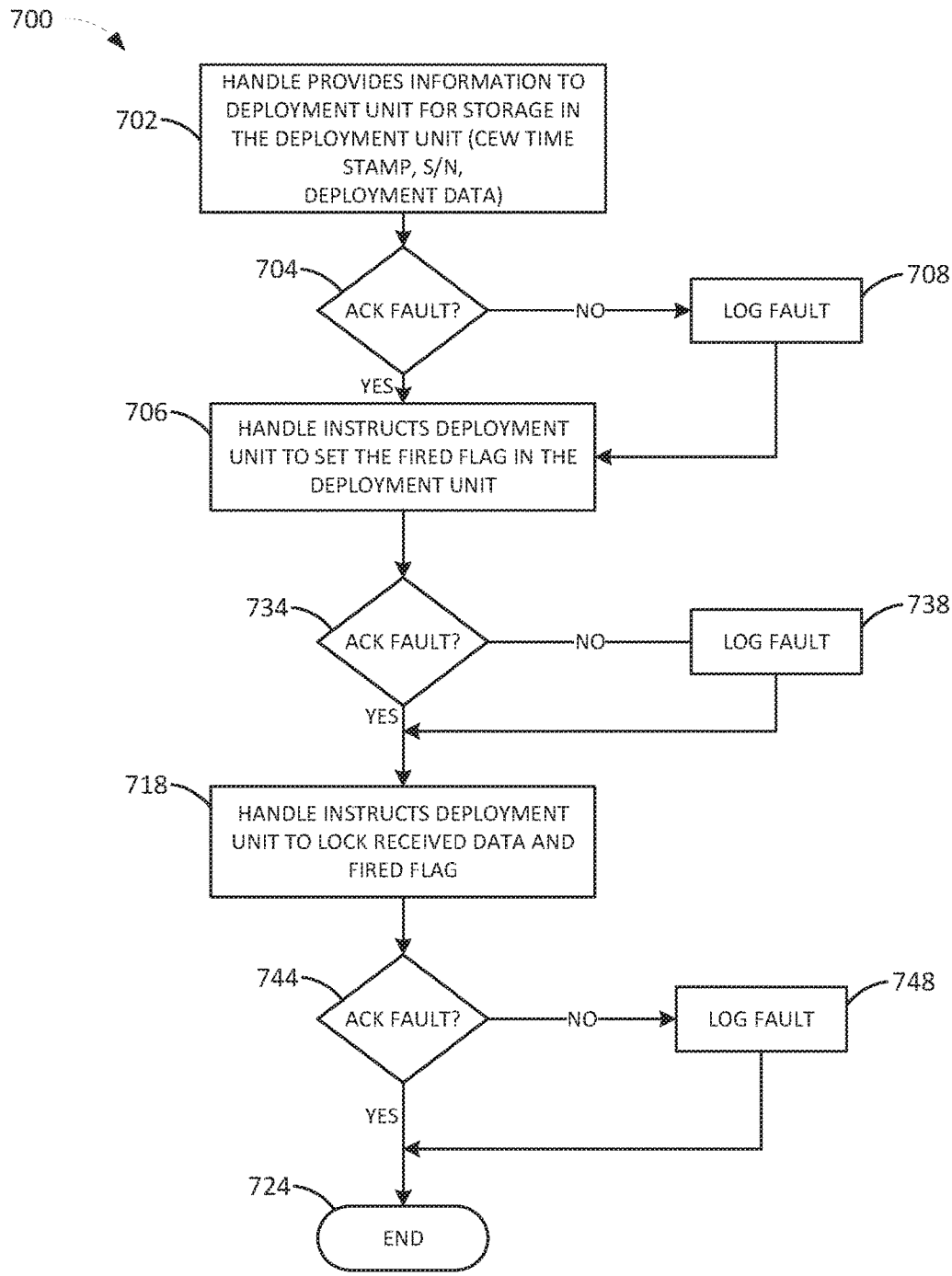
FIG. 7 is a flow diagram of another method performed by the handle of the CEW of FIG. 1 after activation.

A CEW may perform method 700 of FIG. 7 to communicate with a deployment unit after the deployment unit has been fired. Method 700 includes the following processes: provide info 702, ack fault 704, 734, and 744, set fired flag 706, log fault 708, 738, and 748, lock data 718, and end 724. A processing circuit in a handle may perform all or part of method 700. A processing unit of a handle may cooperate with a processing unit in a deployment unit to perform method 700. A processing circuit of a handle, while performing method 700, may use processes read 432 and write 434 to read data from and write data to a deployment unit.

In process provide info 702, a handle may write data to a deployment unit subsequent to firing the deployment unit. The data written by the handle to the deployment unit may include a time and/or date of firing, the handle serial number, the energy (e.g., charge) delivered, the number of stimulus signals delivered, and other deployment data. The data is stored in non-volatile memory in the deployment unit and may be available for retrieval from the deployment unit at any time. Data from a deployment unit may be retrieved by any handle by inserting the expended deployment unit into a bay of the handle and requesting the deployment unit to provide the data.

For example, processing circuit 218 may write information about firing a deployment unit using process write 434. Processing circuit 218 may send one or more write requests to the deployment unit with the information to be written in the deployment unit. The write requests may contain the data discussed above. The information may be sent via C/D 234 and C/D 350 to deployment unit 340 in bay 224 or C/D 254 and C/D 350 of deployment unit 340 in bay 226. Processing circuit 322 confirms the write request and writes the data in memory 324. Control proceeds to ack fault 704 to await the deployment unit's response to the write request.

In ack fault 704, the handle waits for a response from a deployment unit that has been requested to write data. If a response is not received in a predetermined interval of time, a fault may have occurred. If a response indicates an error, a fault may have occurred. If a response contains corrupted data, a fault may have occurred. If a fault does not occur in the response from the deployment unit, control proceeds to process set fired flag 706. If the response from the deployment unit arrives within the allowed window of time and does not include any errors or corrupted data, control proceeds to process set fired flag 706.

For example, processing circuit 218 waits for a response to a write or read request for a specific period of time.

Processing circuit 218 may set a count-down timer once a write or read request has been sent to a deployment unit. If the timer expires without receiving a response from the deployment unit, processing circuit 218 proceeds to process log fault 708. If processing circuit 218 receives a response from a deployment unit before expiration of the time, but the response indicates an error or includes corrupted data, control proceeds to process log fault 708. If processing circuit 218 receives a write or read response acknowledging receipt and execution of the request by the deployment unit, control proceeds to process set fired flag 706.

In process log fault 708, a CEW records in the handle memory any read or write requests that have not been properly acknowledged by a deployment unit. A proper acknowledgement from a deployment unit returns a message indicating the request was successfully executed. The fault and associated deployment unit identifier are stored in handle memory as part of a log.

For example, and as discussed above, upon expiration of the count-down timer, processing circuit 218 writes a fault in memory 220 to record the deployment unit identifier, the type of request, and a time out fault. Processing circuit 218 may write a fault in memory 220 if the response from a deployment unit indicates a request was not successfully executed. The fault may include the deployment unit identifier, type of message, and returned error type or code. Further, processing circuit 218 may write a fault to memory memorializing the receipt of corrupted data. After recording the fault in memory 220, control proceeds to process set fired flag 706.

Process set fired flag 706 instructs the deployment unit to set a flag in the memory of the deployment unit indicating that the deployment unit has been fired. Control then proceeds to process ack fault 734 to await acknowledgement from the deployment unit as discussed above with respect to ack fault 704.

For example, processing circuit 218 sends a write request via write 434 to the deployment unit. The request instructs the deployment unit to set a location reserved in memory for the fired flag to a fired value (e.g., state). Control proceeds to process ack fault 734. Process ack fault 734 and log fault 738 perform the processes of ack fault 704 and log fault 708 respectively as discussed above. After execution of ack fault 734 and/or log fault 738, control proceeds to process lock data 718.

In process lock data 718, a handle may instruct a deployment unit to protect the fired flag from being altered. A request to protect the fired flag may be contained in a write request. In an implementation, a handle may lock the fired flag upon the flag being set without receiving an explicit request.

For example, processing circuit 218 sends a request to lock the fired flag with a write request via write 434. Processing circuit 322 receives the request and executes code to prevent the fired flag location in memory 324 from being altered. Processing circuit 322 may enable hardware that prevents the fired flag location in memory 324 from being altered. Processing circuit 322 may read the contents of fired flag location in memory and, if set, not perform any further write operations to that location. Processing circuit 322 provides a response to processing circuit 218 indicating the success of the request. Control proceeds to ack fault 744. Process ack fault 744 and log fault 748 perform the processes of ack fault 704 and log fault 708 respectively as discussed above. After execution of ack fault 744 and/or log fault 748, control proceeds to process end 724.

Process end 724 represents the end of execution of method 700.

Figure 8:
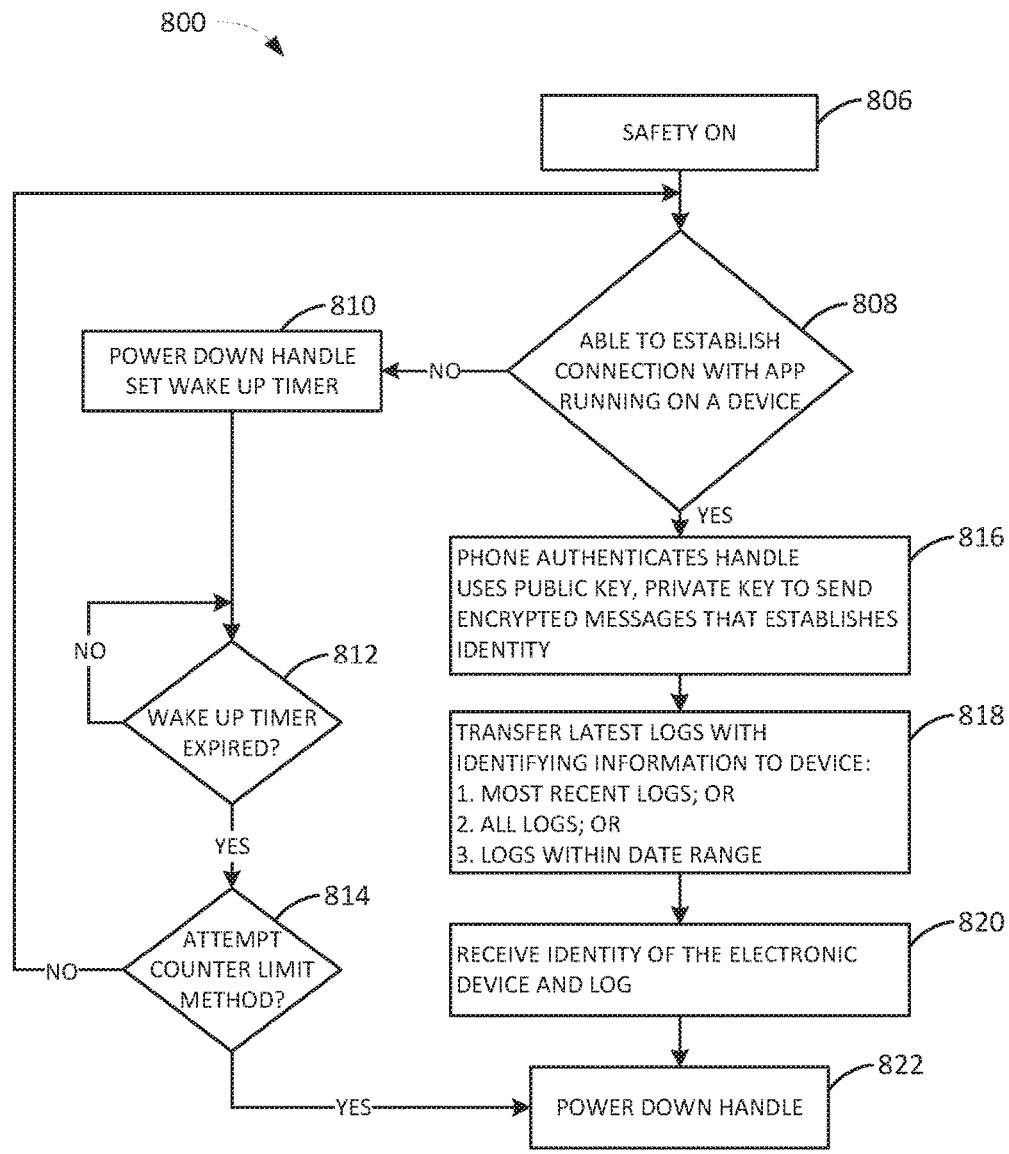
FIG. 8 is a flow diagram of a method of communication between the handle of the CEW of FIG. 1 and an electronic device.

A CEW may perform method 800 of FIG. 8 to communicate with one or more electronic devices. Method 800 may provide data to an electronic device from a handle after the handle is authenticated. Data provided to the electronic device may include logs of CEW usage and/or operation. Method 800 includes the following processes: safety on 806, connect 808, timer 810, wake up 812, counter 814, phone 816, transfer logs 818, identity 820, and power down 822. A processing circuit in a handle may perform all or part of the processes of method 800.

In process safety on 806, the handle detects that the user has move the safety to the on position thereby disarming the CEW. While the CEW is disarmed, it is prevented from energizing it signal generator, launching electrodes, and providing a stimulus signal. Process safety on 806 may cause the transmission of a low energy signal (e.g., beacon) indicating its presence to nearby electronic devices. A proximate electronic device may respond to the beacon.

For example, responsive to the safety switch set to on, processing circuit 218 may instruct communication circuit 222 to broadcast a beacon using Bluetooth Low Energy ("BLE"). Communication circuit 222 may transmit the beacon (e.g., advertisement) that may be received by nearby BLE devices. An electronic device may respond to the beacon and request a connection with the CEW. Control proceeds to connect 808.

In process connect 808, the CEW listens for a response to its beacon from an electronic device. An app (e.g., software, application, program) running on a BLE enabled electronic device scans for BLE beacons. The app seeks and recognizes advertisement messages from a CEW. The app may then request a communication link with the CEW.

For example, communication circuit 222 transmits a BLE beacon and listens for a response from an electronic device. If communication circuit 222 receives a connection request, communication circuit 222 communicates the request to processing circuit 218. Processing circuit 218 determines if the requesting electronic device is authorized to connect with the CEW. If authorized, processing circuit 218 may instruct communication circuit 222 to establish the wireless communication link (e.g., connection). Control proceeds to process phone 816. If a connection request is not received, control proceeds to process timer 810.

In process timer 810, the CEW may be powered down to a reduced power state in which only some components operate, either fully or partially. A timer may be set to indicate when the handle should power up and enable the CEW to broadcast a BLE beacon again and scan for connection requests.

For example, processing circuit 218 may instruct power supply 214, communications circuit 222 and/or other CEW components to enter a reduced power state. In a reduced power state, processing circuit 218 may continue to operate to some level and power may be removed from any deployment units. Processing circuit 218 starts a timer, then control proceeds to process wake up 812.

In wake up 812, the timer runs until a predetermined time has elapsed or a threshold time reached. Once the time has expired, the CEW returns to its powered state and may enable some handle components.

For example, processing circuit 218 may continue running the timer set in timer 810 until the timer has expired by counting down to zero, counting up to a predetermined threshold, or determining an elapsed time. Control proceeds to process counter 814 when the timer has expired.

In process counter 814, the CEW may increment a counter to record the number of times the timer has expired and the CEW has attempted to establish a connection with an electronic device. If a predetermined number of attempts has not been reached, control passes to process connect 808 and the CEW again attempts to establish a connection with an electronic device. If a predetermined number of attempts has been reached, the CEW may power down and await instructions from a user to power up, such as when the user arms the CEW.

For example, processing circuit 218 may increment or decrement a counter that tracks the number of times that the handle as attempted to connect with an electrode device. Processing circuit 218 determines whether the counter has decremented to zero or incremented to a predetermined number. In either case, once the limit on attempts has been reached, control proceeds to process power down 822. If the limit or threshold has not been reached, control returns to connect 808.

If a connection is established in connect 808, the electronic device may authenticate the CEW in phone 816. Authentication (e.g., pairing) may include the exchange of encryption keys for further communication using conventional protocols (e.g., Bluetooth specification version 4.2). With trust established and encryption keys exchanged, the CEW and electronic device may exchange information securely (e.g., encrypted).

For example, communication circuit 222 cooperates with processing circuit 218 to perform an authentication process with electronic device 170. Public keys may be exchanged so that the CEW and electronic device 170 may establish trust and exchange encrypted messages. The public key enables the CEW to decrypt messages encrypted by the electronic device using a private key and vice versa. Encrypted communication may also be used establish the identity of the sending device by the transfer of messages that provide identity information. Once the CEW has been authenticated to electronic device 170, control proceeds to process transfer logs 818.

In process transfer logs 818, an electronic device may request identifying information and/or logs from a CEW. An electronic device may request all logs stored in a CEW, logs from a specified date range, and/or logs within a time interval (e.g., last thirty days, previous seven days). The electronic device may transfer the logs to a website. The transfer to a website may include secure and/or encrypted data exchange between the electronic device and the server of the website.

For example, communication circuit 222 cooperates with processing circuit 218 and memory 220 to provide the log data requested by electronic device 170. Communication circuit 222 receives the log request and decrypts the request message in cooperation with processing circuit 218. Processing circuit 218 retrieves the log information from memory 220 and, in cooperation with communication circuit 222, assembles the information into a format for encryption and transmission to electronic device 170. Once the logs have been transferred to electronic device 170, control proceeds to process identity 820.

In process identity 820, a CEW may record information identifying the electronic device that received the data transferred in process transfer logs 818. A CEW may record what information was provided to the electronic device. A CEW may record a date and/or time that information was requested and/or transferred to the electronic device. A CEW may include transfer information in a log.

For example, processing circuit 218 writes the identity of electronic device 170 to memory 220. Processing circuit 218 also writes the date ranges of the transferred logs as well as the date and/or time the logs were transferred. Processing circuit 218 may include the transfer information in subsequent log requests from an electronic device. After writing a record of the log transfer in memory 220, control proceeds to process power down 822.

In process power down 822, the CEW goes to an idle or sleep state to conserve power. Power may be reduced so that user interface 212 and processing circuit 218 may perform limited functionality. Power may be cut entirely to other CEW components. The CEW may remain in a power down state until detection of a user control restoring normal operation, such as moving the safety switch to the off position to arm the CEW.

For example, processing circuit 218 cooperates with power supply 214 to reduce power consumption. Power supply 214 provides full or partial power to user interface 212, processing circuit 218, and memory 220. Power supply 214 reduces or severs power to other CEW components. If a user input is received by user interface 212 to power up the CEW, processing circuit 218 receives the request from user interface 212 and instruct power supply 214 to restore normal power. Power supply 214 may supply limited or no power to signal generator 216 until the CEW is armed.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

What is claimed is:

1. A conducted electrical weapon ("CEW") for delivering a current through one or more provided targets to impede locomotion of the one or more targets, the CEW comprising:
   a handle, the handle includes a first processing circuit, a power supply, a signal generator for producing the current, and a plurality of bays, each bay includes a coupler;

a plurality of deployment units, each deployment unit includes a second processing circuit, a coupler, and at least two wire-tethered electrodes for launching toward the one or more targets to provide the current, each deployment unit configured to be inserted into any one bay so that one or more bays may hold a respective deployment unit; wherein for each deployment unit inserted into one bay:

the coupler of the bay physically contacts the coupler of the deployment unit to electrically couple the handle to the deployment unit for transferring data between the handle and the deployment unit;

the first processing circuit sends a first data to the second processing circuit;

the second processing circuit encodes the first data to create an encoded first data and sends the encoded first data to the first processing circuit;

the first processing circuit examines the encoded first data to authenticate the deployment unit; and responsive to authentication, the first processing circuit indicates that the deployment unit is available for launching the at least two electrodes of the deployment unit toward the one or more targets to provide the current through the one or more targets to impede locomotion of the one or more targets.

2. The CEW of claim 1 wherein the coupler of the bay provides power from the power supply to the second processing circuit of the deployment unit.

3. The CEW of claim 1 wherein:
the first and second processing circuits each encode the first data using a predetermined algorithm; and
the first processing circuit authenticates the deployment unit by comparing the encoded first data from the second processing circuit with data encoded by the first processing circuit.

4. The CEW of claim 1 wherein:
the deployment unit further includes a memory;
the first processing circuit sends a second data to the second processing circuit, the second data includes a fired status indicating that the deployment unit has been deployed; and
the second processing circuit stores the fired status in the memory.

5. The CEW of claim 4 wherein the fired status stored in the memory is unalterable after being stored.

6. The CEW of claim 1 wherein:
the first processing circuit sends a request for a second data to the second processing circuit; and
responsive to the request for the second data, the second processing circuit sends the second data wherein the second data includes indicia about the deployment unit.

7. The CEW of claim 6 wherein the indicia includes at least one of manufacturer, data of manufacture, deployment unit type, revision, expiration data, unique identifier, and fired status.

8. A deployment unit that cooperates with a provided handle to deliver a current through a provided human or animal target to impede locomotion of the target, the deployment unit comprising:
a coupler;
a processing circuit;
two or more wire-tethered electrodes; and
a pyrotechnic; wherein:
the deployment unit is configured for inserting into any one bay of the handle;

while the deployment unit is inserted into the one bay, the processing circuit receives power via the coupler for performing one or more operation;

the processing circuit receives a data from the handle via the coupler;

the processing circuit encodes the data to create an encoded data;

the processing circuit transmits the encoded data to the handle via the coupler, the encoded data for enabling the handle to authenticate the deployment unit;

responsive to authentication, a launch signal from the handle ignites the pyrotechnic for launching the two or more wire-tethered electrodes toward the target; and a stimulus signal from the handle is delivered through the target via the launched wire-tethered electrodes to impede the locomotion of the target.

9. The deployment unit of claim 8 further comprises a memory for storing deployment unit indicia, wherein the indicia includes at least one of manufacturer, data of manufacture, deployment unit type, revision, expiration data, unique identifier, and fired status.

10. The deployment unit of claim 9 wherein the fired status is unalterable after being set to fired.

11. The deployment unit of claim 8 further comprising a first electrical ground and a second electrical ground wherein:
the first electrical ground provides a first voltage reference for the processing circuit; and
the second electrical ground provides a second voltage reference for the launch signal.

12. The deployment unit of claim 8 further comprises a memory wherein:
responsive to receiving the launch signal, the processing circuit receives a second data that includes a fired status indicating that the deployment unit has been deployed; and
the processing circuit stores the fired status in the memory.

13. The deployment unit of claim 8 wherein:
responsive to a request from the handle, the processing circuit provides a second data to the handle; and
the second data includes indicia about the deployment unit.

14. A handle that cooperates with a plurality of provided deployment units to provide a current through a provided human or animal target to impede locomotion of the target, the handle comprising:
a plurality of bays, each bay includes a coupler, each bay configured to receive one deployment unit so that one or more bays hold a respective deployment unit, each deployment unit includes a coupler;
a processing circuit;
a power supply; and
a signal generator for provide the current; wherein:
while one deployment unit is inserted into one bay of the plurality, the coupler of the one bay physically contacts the coupler of the one deployment unit to electrically couple the handle to the one deployment unit for transferring data between the handle and for the power supply to provide power to the one deployment unit;
the processing circuit provides a data to the one deployment unit;
the processing circuit receives an encoded data from the one deployment unit, the data is encoded by the one deployment unit to create the encoded data;

the processing circuit uses the encoded data to authenticate the one deployment unit; and responsive to authentication, the processing circuit indicates that the deployment unit inserted into the one bay is available for launching at least two electrodes toward the target to provide the current through the target to impede locomotion of the target.

15. The handle of claim 14 wherein the processing circuit encodes the data provided to the deployment unit to compare with the encode data from the deployment unit for authentication.

16. The handle of claim 14 wherein the processing circuit requests deployment unit indicia from the one deployment unit, the indicia includes at least one of manufacturer, data of manufacture, deployment unit type, revision, expiration data, unique identifier, and fired status.

17. The handle of claim 14 wherein the data provided to the one deployment unit further includes deployment status.

* * * * *